United States Patent [19]

Heras

[11] Patent Number: 4,476,810

[45] Date of Patent: Oct. 16, 1984

[54] DOG TRAINING DEVICE

[76] Inventor: Roberto F. Heras, 2122 NW. 24th St., Miami, Fla. 33142

[21] Appl. No.: 499,298

[22] Filed: May 31, 1983

[51] Int. Cl.³ .............................................. A01K 15/00
[52] U.S. Cl. ..................................................... 119/29
[58] Field of Search ........................................ 119/29

[56] References Cited

U.S. PATENT DOCUMENTS 2,579,178 12/1951 Dierking ............................... 119/29
4,074,657 2/1978 Senior et al. ........................... 119/29

FOREIGN PATENT DOCUMENTS 282589 of 1915 Fed. Rep. of Germany ........ 119/29
289757 1/1916 Fed. Rep. of Germany ........ 119/29

*Primary Examiner*—Gene Mancene
*Assistant Examiner*—Kris R. Schulze
*Attorney, Agent, or Firm*—Jesus Sanchelima

[57] ABSTRACT

A device for delivering an electric discharge to pets coming into contact with or coming close to bait, having an electrically insulated housing, circuitry for generating a high voltage mounted within the housing, including a battery to feed itself, an electrode surrounds the periphery of the housing and connected to one pole of the high voltage circuitry, and a second electrode mounted on the top cover of the housing connecting the other pole of the high voltage circuitry to the bait so that the electric circuit between the first and second electrode may be closed by the pet.

4 Claims, 3 Drawing Figures

DOG TRAINING DEVICE

BACKGROUND OF THE INVENTION

1. Field of the Invention

The present invention relates to dog training devices, and particularly, to those devices that deliver an electrical discharge to the pet under certain conditions.

2. Description of the Prior Art

The need for training dogs to eat food that is not meant for them is illustrated in the two situations that follow:

Dogs, especially security dogs, are usually distracted by a thief who provides it with a piece of meat while he undertakes his unlawful activities. The meat is usually poisoned and the dog ceases to be a security factor obstructing the thief.

A different situation involves spoiled meat that the pet finds and without hesitation eats.

The closest prior art found corresponds to German Pat. No. 289,757 issued to Hermann Grohmann in 1913. Grohmann discloses a bulky device that is electrically powered and requires the actual biting, and consequently tasting, of the bait by the dog which in turn transmits a pulling force that brings disks n and o in contact. In the present invention there is no need for the dog to pull the bait. Merely coming close enough to the device may trigger the discharge of the high voltage generated arching to the dog's moist tongue and jaws. The simplicity of the structure, without surrounding wires and electrical elements, resembles more a piece of meat likely to be found by a dog which would require its disciplined abstenation.

Other references directed to the field involving devices that deliver electrical discharges to animals include British Pat. No. 320,992 issued to Oliver Gerald Culverwell and entitled "Devices for the Treatment of Poultry;" U.S. Pat. No. 4,153,009 issued to William Boyle and entitled "Electric shock training device for animals;" and U.S. Pat. No. 2,800,104 issued to R. C. Cameron et al for a "Radio controlled electric cutaneous signal type animal obedience device."

Other patents describing the closest subject matter provide for a number of more or less complicated features that fail to solve the problem in an efficient and economical way. None of these patenet suggest that novel features of the present invention.

SUMMARY OF THE INVENTION

It is the main object of the present invention to provide a self-contained unconspicous device for delivering electric discharge to dogs when attracted to feed baits not intended for their consumption.

It is another object of the present invention to provide such a device that is easy and inexpensive to manufacture and install.

It is yet another object of the present invention to provide such a device that is battery operated.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description when read in conjunction with the accompanying drawings n which.

DETAILED DESCRIPTION OF THE PREFERRED EMBODIMENT

Figure 1:
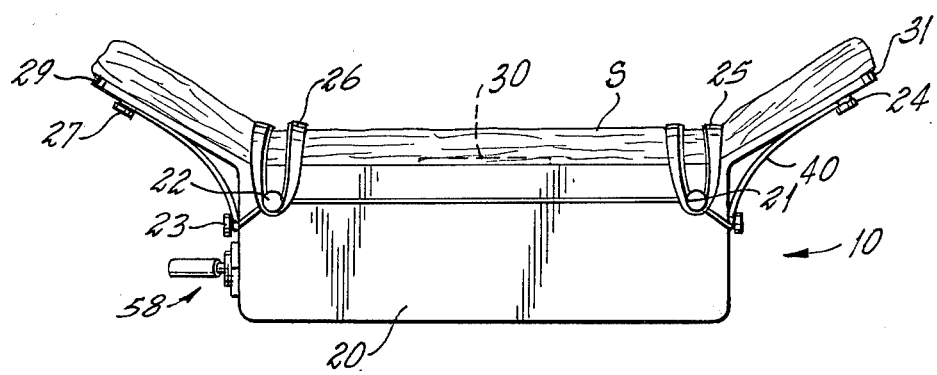
FIG. 1 is a front view of the preferred embodiment of the invention.

Referring now to FIG. 1 where the invention is referred to generally with numeral 10, it can be seen that it includes, basically, an electrically insulated housing 20 which supports a steak "S" which is held in place by rubber bands 25 and 26 placed around support poles 21 and 22. Flanges 29 and 31 extends outwardly from the sides and their purpose is to facilitate the biting of the bait and closing the circuit. A pair of electrodes, 30 and 40 corresponding to a protruding wire 30 on the top of housing 20 and a peripherally arranged wire 40 which is structurally kept in place by support posts 21; 22; 23; 24 and 27.

Figure 2:
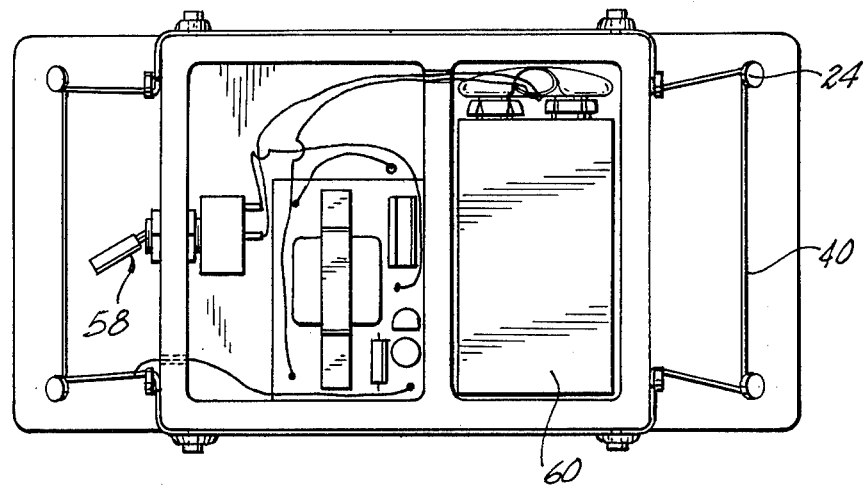
FIG. 2 is a bottom view of the device with its bottom plate removed.
Figure 3:
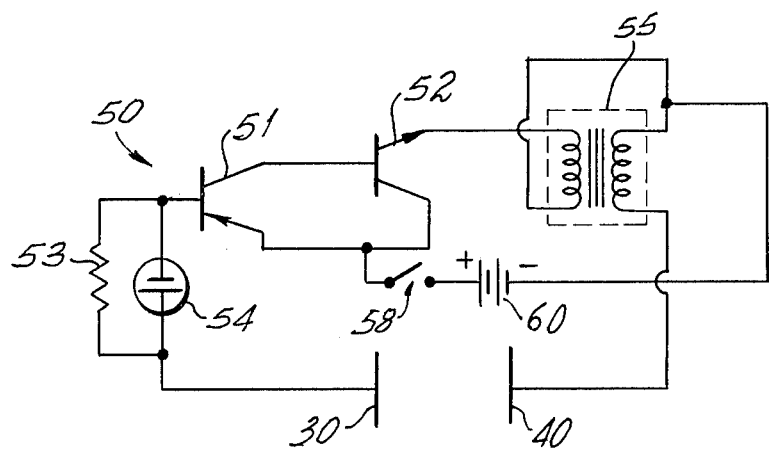
FIG. 3 represents a schematic diagram of the circuit for producing the electrical discharge.

In FIG. 2, we can see the relative positioning of the electronic circuit components. A standard 9-volt battery 60 fits in a compartment on the right side and the rest of the electronic circuitry 50 fits in the left compartment. Basically, this circuit is intended to produce a pulsating D.C. current that is then passed through a step-up output transformer 55 that elevates the voltage high enough to provide an electric discharge to the pet when it attempts to bite the steak "S" and closes the circuit between electrodes 30 and 40. In the preferred embodiment, the circuit shown in FIG. 3 provides an output of approximately 440 volts, at 300 Hz. The circuitry 50 consumes a minimum of electric power while it is on thereby allowing a long life to the battery. The maximum power consumption is experienced when the pet relieves a discharge.

Basically, circuitry 50 includes a transistor 51 which is a PNP transistor such as the TCG159 manufactured by New-Tone Electronics, Bloomfield, N.J., 07003, but other equivalents like ECG159; SK3466 and GE82 may also be used. Transisitor 52 is an NPN transistor such as the RCA SK3893 that is commercially available. Resistor 53 has a 3.3 megohm resistance and neon lamp 54 such as the Radio Shack 2721101 (N2 lamp). Transformer 55 has 70 turns in the primary of No. 32 wire and 2400 turns on No. 43 wire in the preferred embodiment. Battery 60 is, preferrably, an alkaline commercially available 9-volt battery. Switch 58 is a single pole, single throw switch, in the preferred embodiment.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense, except as set forth in the following appended claims.

I claim:

1. A device for delivering an electric discharge to pets coming into contact with a bait, comprising, in operative combination:

A. an electrically insulated housing having means for supporting the bait in a laterally outward direction from the housing so as to be accessible to the pet;

B. circuitry means for generating a high voltage mounted within said housing, including an output with at least two poles, and further including self-contained battery means to supply an electric current to said circuitry means;

C. first electrode means attached to and surrounding the periphery of said housing and connected to one pole of said high voltage circuitry means;

D. second electrode means mounted on the top surface of said housing connecting the other pole of said high voltage circuitry means to the bait so that the electric circuit between said first and second electrode means may be closed by the pet as the pet bites the bait.

2. The device set forth in claim 1 wherein said said means for supporting the bait includes a pair of lateral flanges that extent outwardly.

3. The device as set forth in claim 2 further including:
E. switch means for interrupting the electrical connection of said battery means to said circuitry means.

4. The device set forth in claim 3 further including:
F. retaining means mounted on top of said housing and adapted to hold said bait in place.

* * * * *